US011102756B2

(12) United States Patent
Hsieh et al.

(10) Patent No.: US 11,102,756 B2
(45) Date of Patent: Aug. 24, 2021

(54) ENHANCEMENT FOR PAGING INDICATION AND RADIO RESOURCE MANAGEMENT (RRM) MEASUREMENTS FOR UE POWER SAVING IN A WIRELESS NETWORK

(71) Applicant: MediaTek Inc., Hsinchu (TW)

(72) Inventors: Chi-Hsuan Hsieh, Hsinchu (TW); Wei-De Wu, Hsinchu (TW); Yung-Hsiang Liu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/787,522

(22) Filed: Feb. 11, 2020

(65) Prior Publication Data

US 2020/0267690 A1 Aug. 20, 2020

Related U.S. Application Data

(60) Provisional application No. 62/806,061, filed on Feb. 15, 2019.

(51) Int. Cl.
*H04W 68/02* (2009.01)
*H04W 76/27* (2018.01)
(Continued)

(52) U.S. Cl.
CPC .......... *H04W 68/02* (2013.01); *H04B 17/318* (2015.01); *H04B 17/336* (2015.01);
(Continued)

(58) Field of Classification Search
CPC ..... H04W 68/02; H04W 76/27; H04W 24/10; H04W 56/001; H04W 76/28; H04W 48/16; H04B 17/318; H04B 17/336; Y02D 30/70
See application file for complete search history.

(56) References Cited

U.S. PATENT DOCUMENTS

| 2017/0026861 A1 | 1/2017 | Tseng et al. |
| 2018/0098287 A1 | 4/2018 | Ang et al. |

(Continued)

FOREIGN PATENT DOCUMENTS

WO 2018144873 A1 8/2018

OTHER PUBLICATIONS

The International Search Report and the Written Opinion, PCT/CN2020/075212, dated Feb. 14, 2020.

*Primary Examiner* — Diane D Mizrahi
(74) *Attorney, Agent, or Firm* — Tong J. Lee (57) ABSTRACT

In one aspect, a User Equipment (UE) performs Radio Resource Management (RRM) measurements on downlink signals with a first cycle period equal to the UE's Discontinuous Reception (DRX) cycle period. The RRM measurements cycle period is lengthened when UE detects that a signal quality measurement of the primary cell is greater than the sum of a positive offset and a signal quality measurement of a neighboring cell having the best signal quality among all of UE's neighboring cells. In another aspect, a UE de-multiplexes a paging indication which precedes a Synchronization Signal Block (SSB) in time and is generated using the same sequence generation formula as that for generating a Secondary Synchronization Signal (SSS) in the SSB. From the de-multiplexed paging indication, the UE detects that it is paged for message reception and wakes up to receive the message in a next data reception period of the UE's DRX cycle.

9 Claims, 8 Drawing Sheets

(51) Int. Cl.
*H04W 24/10* (2009.01)
*H04B 17/318* (2015.01)
*H04W 56/00* (2009.01)
*H04B 17/336* (2015.01)
*H04W 76/28* (2018.01)

(52) U.S. Cl.
CPC ......... *H04W 24/10* (2013.01); *H04W 56/001* (2013.01); *H04W 76/27* (2018.02); *H04W 76/28* (2018.02)

(56) References Cited

U.S. PATENT DOCUMENTS

2019/0364492 A1* 11/2019 Azizi ................ H04W 52/0264
2020/0137604 A1 4/2020 Chen et al.

* cited by examiner

ENHANCEMENT FOR PAGING INDICATION AND RADIO RESOURCE MANAGEMENT (RRM) MEASUREMENTS FOR UE POWER SAVING IN A WIRELESS NETWORK

CROSS-REFERENCE TO RELATED APPLICATIONS

This application claims the benefit of U.S. Provisional Application No. 62/806,061 filed on Feb. 15, 2019, the entirety of which is incorporated by reference herein.

TECHNICAL FIELD

Embodiments of the invention relate to wireless communications; more specifically, to power saving schemes for a User Equipment (UE) to receive paging indication and perform Radio Resource Management (RRM) measurements.

BACKGROUND

The Fifth Generation New Radio (5G NR) is a telecommunication standard for mobile broadband communications. 5G NR is promulgated by the 3rd Generation Partnership Project (3GPP) to significantly improve on performance metrics such as latency, reliability, throughput, etc.

A User Equipment (UE) in a 5G NR network periodically measures the quality of received signals, such as Reference Signal Received Power (RSRP) or Reference Signal Received Quality (RSRQ). These measurements, referred to as the Radio Resource Management (RRM) measurements, may be reported back to a base station for resource management. RRM enables a wireless network to efficiently utilize its limited radio frequency resources. RRM measurements can be used for the management of limited radio frequency resources to enhance the performance of wireless connections and mobility operations, such as handover. Based on the RRM measurements, a base station configures parameters such as transmit power, user allocation, beamforming, data rates, handover criteria, modulation scheme, error coding scheme, etc. However, performing RRM measurements consumes UE power.

Furthermore, a UE monitors the downlink channel for a paging signal. The paging signal indicates to the UE that a message destined for the UE is pending at the network. An idle mode UE may wake up periodically to receive the paging signal. Monitoring the paging signal also consumes UE power.

A common goal in operating a wireless network is to achieve high communication performance with energy efficiency. Energy efficiency is especially a concern for a battery-powered UE which needs to conserve battery power. Thus, there is a need for reducing power consumption in UEs.

SUMMARY

In one embodiment, a method is performed by a UE in a wireless network for RRM measurements. According to the method, the UE performs RRM measurements on downlink signals with a first cycle period equal to a Discontinuous Reception (DRX) cycle period of the UE. The downlink signals are broadcast periodically from a base station. The UE detects an indication that a signal quality measurement of the primary cell is greater than a sum of a positive offset and a signal quality measurement of a best neighboring cell that has a best signal quality among all of neighboring cells of the UE. In response to the indication, the UE performs the RRM measurements with a second cycle period which is longer than the first cycle period.

In another embodiment, a method is performed by a UE in a wireless network. According to the method, the UE de-multiplexes a paging indication broadcast from a base station to a primary cell of the UE. The paging indication precedes a Synchronization Signal Block (SSB) in time and is generated using a same sequence generation formula as that for generating a Secondary Synchronization Signal (SSS) in the SSB. The UE detects, from the de-multiplexed paging indication, that the UE is paged for reception of a message. In response to the detection, the UE wakes up from a sleep state to receive the message from the base station in a next data reception period of a DRX cycle of the UE.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Disclosed herein are power-saving schemes for a UE to perform RRM measurements based on synchronization signal blocks (SSBs). The UE performs RRM measurements periodically to determine received signal power and/or quality. When a predetermined condition is satisfied, the RRM measurement cycle period may be relaxed to save power. Specifically, the cycle period of the RRM measurements is lengthened when a predefined condition is satisfied. Lengthening the cycle period can reduce the overhead incurred by the RRM measurements and thereby save UE power. When the predetermined condition is no longer satisfied, the cycle period of the RRM measurements may be restored to the original value. The RRM measurements may include measurements of one or more of the following: Reference Signal Received Power (RSRP), Reference Signal Received Quality (RSRQ), and Signal to interference and noise ratio (SINR).

Further disclosed herein are paging schemes that use multiplexed control signals to page multiple UEs. These control signals are hereinafter referred to as paging indication signals or paging indications. A base station may generate the paging indication signals using the same sequence generation formula as that for generating the Secondary Synchronization Signal (SSS) in an SSB, and designate each page indication signal for paging a respective paging group. A paging group includes one or more UEs. A base station may broadcast multiplexed paging indication signals to multiple paging groups. The network may configure the UEs to receive their respective paging indication signals at predetermined time instants and frequencies. When a UE receives a paging indication signal indicating that the network has a message pending for the UE, the paging indication signal indicates to the UE that its base station is going to send the message in the UE's next scheduled reception opportunity.

According to the embodiments described herein, a UE operates in a wireless network according to standards that are based on, compatible with, or extensions of 5G NR. The disclosed RRM measurements may be performed by a UE on downlink transmissions from a base station (known as gNodeB or gNB in a 5G network). Moreover, the disclosed paging indication signals may be received by a UE on the downlink transmissions. In some examples, downlink transmissions may include transmissions of downlink control information, reference signals, synchronization signals, etc. Downlink signals may be modulated by multiple subcarriers (e.g., waveform signals of different frequencies) according to various radio technologies.

Figure 1:
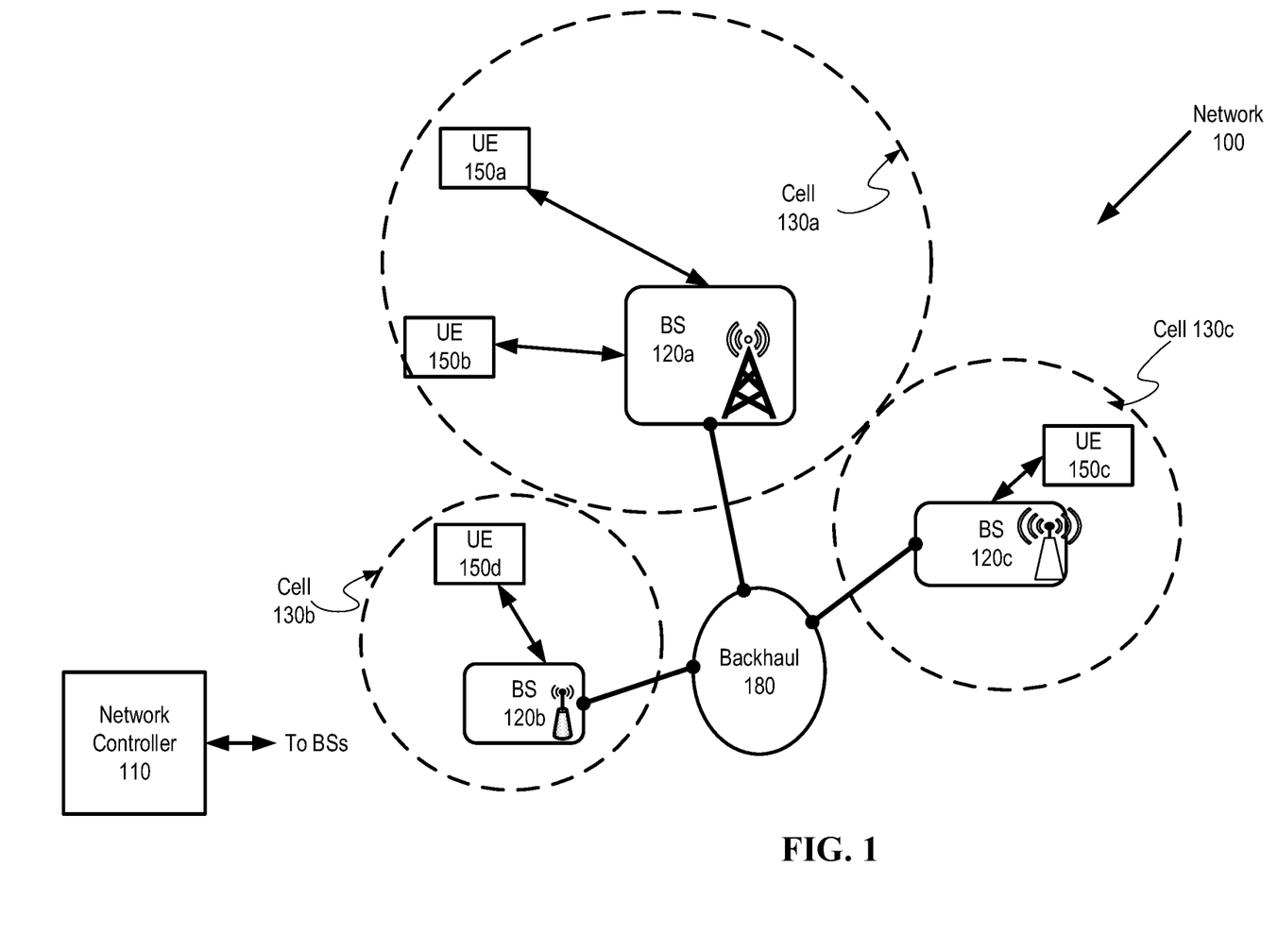
FIG. 1 is a diagram illustrating a network in which the embodiments of the present invention may be practiced.

FIG. 1 is a diagram illustrating a network 100 in which the embodiments of the present invention may be practiced. The network 100 is a wireless network which may be a 5G NR network. To simplify the discussion, the methods and apparatuses are described within the context of a 5G NR network. However, one of ordinary skill in the art would understand that the methods and apparatuses described herein are applicable to a variety of other multi-access technologies and the telecommunication standards that employ these technologies.

The number and arrangement of components shown in FIG. 1 are provided as an example. In practice, the network 100 may include additional devices, fewer devices, different devices, or differently arranged devices than those shown in FIG. 1.

Referring to FIG. 1, the network 100 may include a number of base stations (BSs), such as BSs 120a, 120b, and 120c, collectively referred to as the BSs 120. In some network environments such as a 5G NR network, a BS may be known as a gNodeB, a gNB, and/or the like. In an alternative network environment, a BS may be known by other names. Each BS 120 serves (i.e., provides communication coverage for) a particular geographic area known as a cell, such as a cell 130a, 130b or 130c, collectively referred to as cells 130. The radius of a cell size may range from several kilometers to a few meters. The cell providing wireless service to a UE is the primary cell (PCell) of the UE. For example, cell 130a is the PCell of UE 150a.

A BS may communicate with one or more other BSs or network entities directly or indirectly via a backhaul 180, which may be wireless or wirelined. A network controller 110 may be coupled to a set of BSs such as the BSs 120 to coordinate, configure, and control these BSs 120. The network controller 110 may communicate with the BSs 120 via a backhaul (e.g., the backhaul 180).

The network 100 further includes a number of user equipment terminals (UEs), such as UEs 150a, 150b, 150c and 150d, collectively referred to as the UEs 150. The UEs 150 may be anywhere in the network 100, and each UE 150 may be stationary or mobile. The UEs 150 may also be known by other names, such as a mobile station, a subscriber unit, and/or the like. Some of the UEs 150 may be implemented as part of a vehicle. Examples of the UEs 150 may include a cellular phone (e.g., a smartphone), a wireless communication device, a handheld device, a laptop computer, a cordless phone, a tablet, a gaming device, a wearable device, an entertainment device, a sensor, an infotainment device, Internet-of-Things (IoT) devices, or any device that can communicate via a wireless medium.

In one embodiment, the UEs 150 may communicate with their respective BSs 120 in their respective cells 130. The transmission from a UE to a BS is called uplink transmission, and from a BS to a UE is called downlink transmission.

Figure 2:
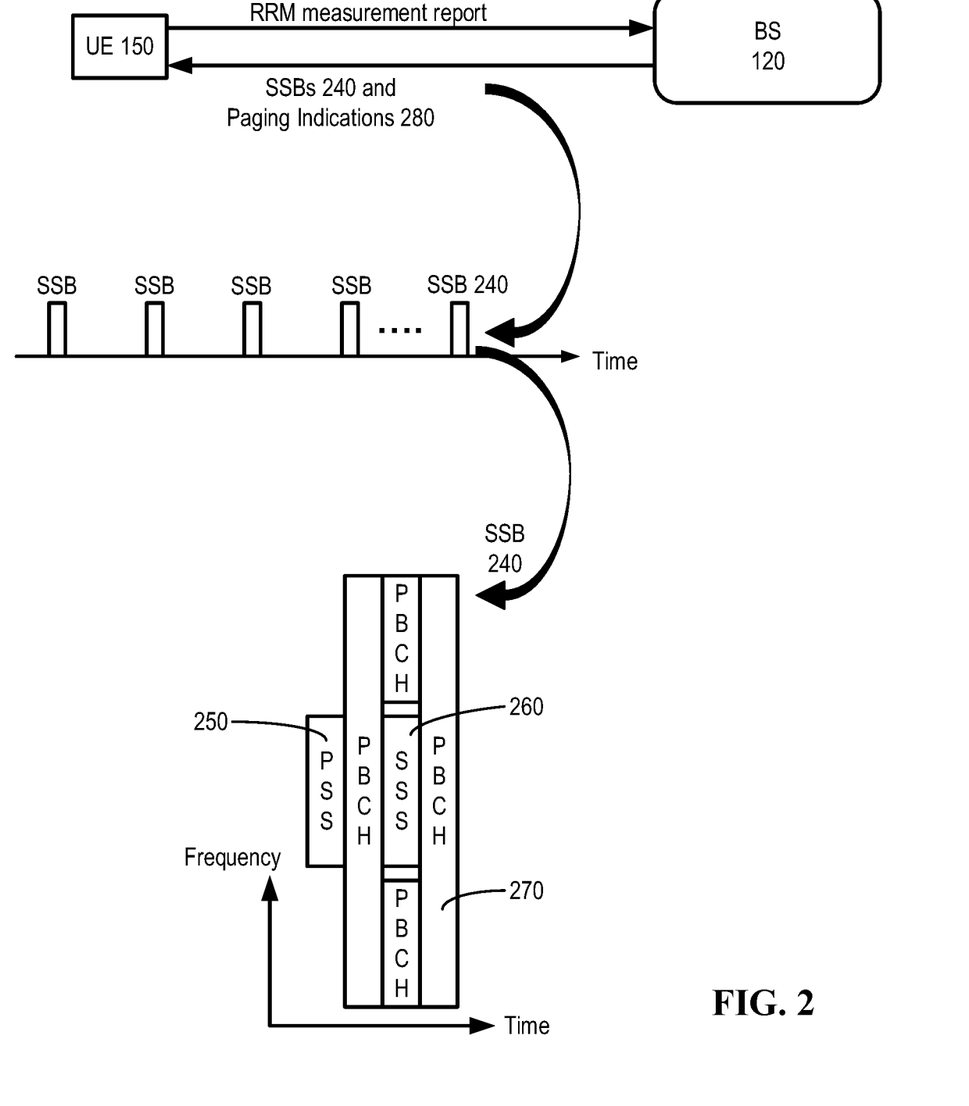
FIG. 2 is a schematic diagram illustrating information exchanges between a UE and a base station according to one embodiment.

FIG. 2 is a schematic diagram illustrating information exchanges between the UE 150 and the BS 120 according to one embodiment. The UE 150 and the BS 120 may be any of the UEs and BSs, respectively, described in connection with FIG. 1. The UE 150 is configured to perform RRM measurements periodically. The UE 150 is also configured to monitor a paging channel periodically. In one embodiment, the UE 150 may use a sequence of SSBs 240 and a sequence of paging indications 280 from the BS 120 to perform RRM measurements. The BS 120 periodically broadcasts the SSBs 240 specifically to the cell that the BS 120 serves; that is, the SSBs 240 are cell-specific. Each SSB 240 carries system information to the UEs in the cell identified by a Cell ID. The UEs can find out in which cell they are located by decoding the Cell ID in the received SSB 240. In alternative embodiments, the UE 150 may perform RRM measurements based on other signals transmitted from a BS 120.

The paging indication 280 may be sent when the network has a message pending for a UE or UEs to receive. When the network has no pending message for a UE, the UE may use the paging indication 280 to aid the RRM measurements; e.g., by using the paging indication 280 for Automatic Gain Control (AGC) tuning before each RRM measurement.

FIG. 2 further illustrates that each SSB 240 is composed of a Primary Synchronization Signal (PSS) 250, a Secondary Synchronization Signal (SSS) 260 and a Physical Broadcast Channel (PBCH) 270. With Orthogonal Frequency-Division Multiplexing (OFDM), PSS 250 occupies symbol 0, PBCH 270 at symbols 1, 2, 3 and SSS 260 at symbol 2. The BS 120 broadcast SSBs 240 periodically to the UEs in its cell. The periodicity (i.e., the cycle period) of the SSBs 240 may be configured by the BS; e.g., 20 milliseconds (ms), 40 ms, etc. The BS 120 may inform configuration parameters of the SSBs 240 to the UE 120 via Radio Resource Control (RRC) signaling.

The UE 150 identifies a Cell ID from PSS 250 and SSS 260, and decodes basic system information from PBCH 270, such as frame, slot, and symbol timing. According to the system information, the UE 150 can perform random access to the radio frequency (RF) resources. Time synchronization (in terms of symbol-level and slot-level) and frequency synchronization can also be realized via PSS 250 and SSS 260. In one embodiment, the UE 150 may perform RRM measurements periodically on a subset of the SSBs 240, e.g., according to configured RRM measurement timing; e.g., the RRM measurement window and cycle period.

In one embodiment, each RRM measurement includes a cell search process, an SSB index (SBI) acquisition process, and an RSRP measurement period. In an embodiment where each RRM measurement uses an SSB 240, the cell search process identifies the Cell ID from PSS 250 and SSS 260, the SBI may be carried by PBCH 270, and the RSRP (and/or RSRQ, SINR) may be measured from SSS 260.

In a 5G NR network, a connected mode UE is a UE in active data communication with the BS. When there is no data communication to/from the UE, the UE may enter an idle mode to save power. Both the connected mode UEs and the idle mode UEs perform periodic RRM measurements, but only the connected mode UEs report the measurement results back to their corresponding BSs. The reported RRM measurement may be an average value of multiple measurements. An idle mode UE may monitor a designated channel for a paging signal to receive an incoming message. The paging signal may be transmitted from a BS to the UE to indicate that a message for the UE is pending at the network.

To further conserve power, a Discontinuous Reception (DRX) mechanism may be activated for UEs in both the connected mode and the idle mode. With the DRX mechanism activated, a UE may stay in a sleep state (e.g., by switching off most of its circuitry) and wake up in periodic DRX ON durations to receive signals from the downlink channel. The signals from the downlink channel may be control and/or data signals. Thus, with the DRX mechanism activated, the downlink signal reception at the UE is discontinuous (i.e., at pre-scheduled time intervals). The cycle period of the DRX ON duration (also referred to as the DRX cycle period) and the length of the DRX ON duration window are configurable parameters controlled by the network. A connected mode UE may have a short DRX cycle period while an idle mode UE may have a long DRX cycle period; that is, an idle mode UE can stay asleep longer than a connected mode UE. To further reduce power consumption, the idle mode DRX cycle period of some UEs (e.g., low-end NR devices such as IoT sensors) may be configured to an extended length (e.g., several minutes) such that these UEs can go into a deep sleep while staying registered with the network.

Figure 3:
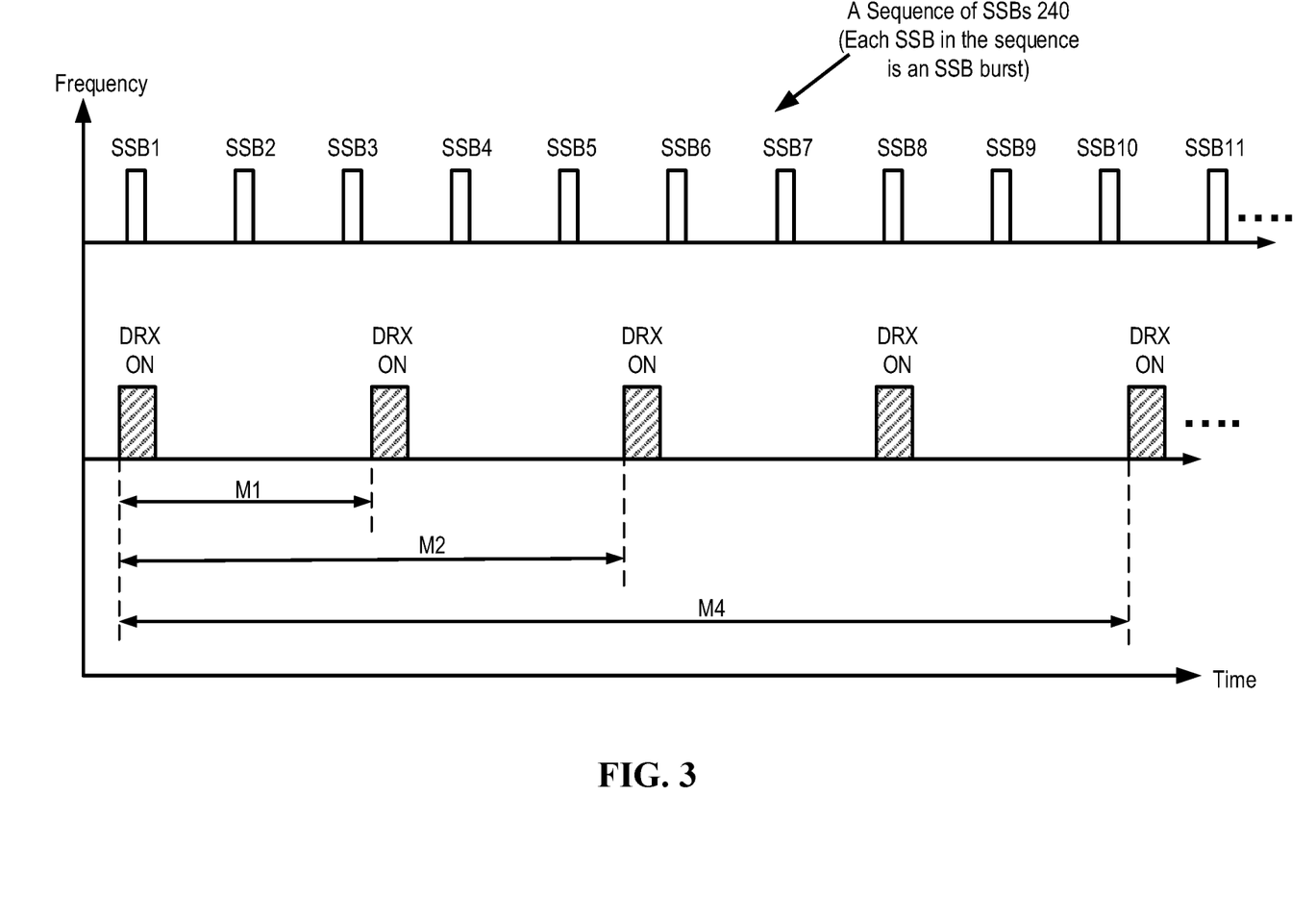
FIG. 3 is a diagram illustrating a power-saving scheme for RRM measurements according to one embodiment.

FIG. 3 is a diagram illustrating a power-saving scheme for RRM measurements according to one embodiment. In this embodiment, the UE performs RRM measurements using an SSB burst in each measurement cycle period. FIG. 3 shows a sequence of SSBs 240 as in FIG. 2. To be more specific, each SSB in the sequence of SSBs 240 is an SSB burst. An SSB burst contains multiple beam-specific SSBs, and each beam-specific SSB is broadcast via one corresponding antenna beam to UEs. Two UEs that are in the coverage of two different beams can receive and measure two different beam-specific SSBs in the same SSB burst. Unless specifically indicated otherwise, the terms "SSB" and "SSB burst" hereinafter are interchangeable. Thus, the terms "SSB cycle" and "SSB cycle period" refer to the cycle and cycle period, respectively, of SSB bursts. It is noted from FIG. 3 that a DRX cycle may not be aligned with an SSB cycle. In some embodiments, the DRX cycle period is longer than an SSB cycle period. That is, a UE may need to periodically receive and decode the SSBs, even when it is outside of DRX ON duration. Thus, an idle mode UE needs to power up its circuitry not only in DRX ON duration, but also to receive SSBs for RRM measurements. Thus, increasing the cycle period for RRM measurements can reduce UE power consumption.

FIG. 3 shows that the DRX cycle period is M1 (millisecond). In one embodiment, a UE may perform RRM measurements at a cycle period equal to M1 by default. When a predefined condition is satisfied, the UE may perform RRM measurements at a relaxed cycle period; e.g., two times (M2) or four times (M4) of the DRX cycle period. For example, when the RRM measurements cycle period is set to M1, the UE may use an SSB burst every M1 time period to perform RRM measurements. When the RRM measurements cycle period is set to M2, the UE may use an SSB burst every M2 time period to perform RRM measurements. When the RRM measurements cycle period is set to M4, the UE may use an SSB burst every M4 time period to perform RRM measurements. The UE may use the SSB preceding and closest in time to the DRX ON duration every Mx time period, where Mx=M1, M2, M4, etc., according to the set RRM measurement cycle period. In some embodiments, the UE may use two or more consecutive SSB bursts every Mx time period, or a combination of at least one SSB burst and at least one additional signal block every Mx time period, to improve the RRM measurements, where Mx=M1, M2, M4, etc., according to the set RRM measurement cycle period.

In one embodiment, the UE may evaluate the predefined condition, and then set its RRM measurement cycle period accordingly. For example, if the UE's received signal quality is above a low threshold, the RRM measurement cycle period may be set to two times the DRX cycle period. If the UE's received signal quality is above a high threshold, the RRM measurement cycle period may be set to four times the DRX cycle period. By performing RRM measurements less often, the UE may stay in the sleep mode longer and can save power.

Although a UE may perform RRM measurements using the SSBs 240, it is understood that a UE may use other downlink signals for RRM measurements. In the methods to be described below with reference to FIG. 4 and FIG. 5, a UE may perform RRM measurements using any downlink signals not limited to the SSBs 240.

Figure 4:
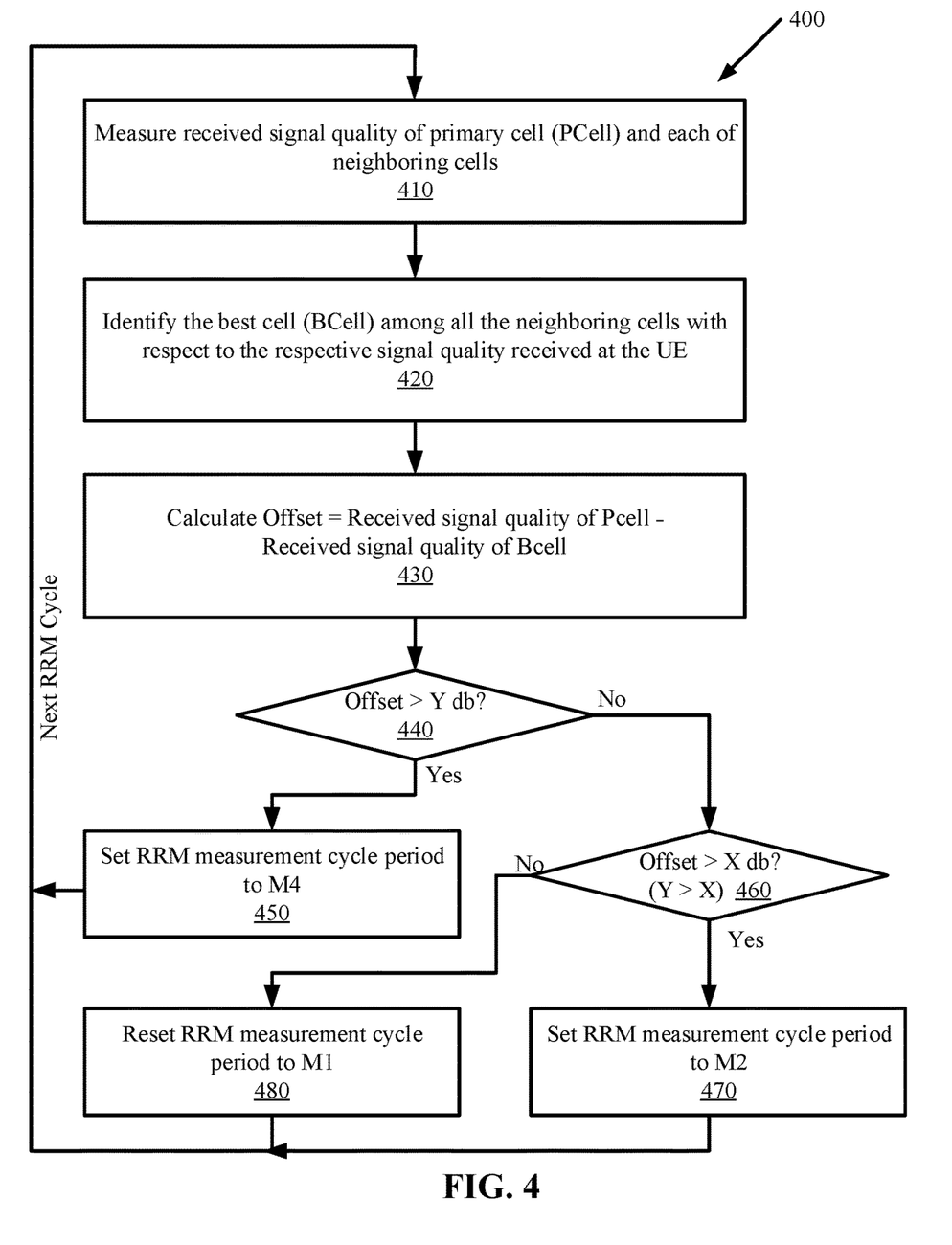
FIG. 4 is a flow diagram illustrating a method for determining an RRM measurement cycle period according to one embodiment.

FIG. 4 is a flow diagram illustrating a method 400 for determining an RRM measurement cycle period according to one embodiment. The method 400 begins when the UE at step 410 measures the received signal quality of its primary cell (PCell) and each of its neighboring cells (e.g., NCell_1, NCell_2, . . . , NCell_k). Taking UE 150a in FIG. 1 as an example, the PCell of UE 150a is cell 130a, and the neighboring cells may include at least cells 130b and 130c. At step 420, the UE identifies the best cell (BCell) among all the neighboring cells NCell_1, NCell_2, . . . , NCell_k with respect to the respective signal quality received at the UE.

The UE at step 430 calculates Offset, which is equal to the received signal quality of PCell minus the received signal quality of BCell. If, at step 440, the calculated Offset is greater than a first offset value (e.g., Y db), the UE's RRM measurement cycle period may be set to a first value (e.g., M4) at step 450. If, at step 460, the calculated Offset is greater than a second offset value (e.g., X db, where X<Y) and not greater than the first offset value Y db, the UE's RRM measurement cycle period may be set to a second value (e.g., M2) at step 470.

As an example, the value of X may be set to 2, and the value of Y may be set to 4. In alternative embodiments, different values of X and Y may be used as long as Y>X. Furthermore, in alternative embodiments, the RRM measurement cycle period may be set to values different from the aforementioned M4 and M2 (which are four times and two times the default DRX cycle period M1, respectively), as long as the first value (M4) is greater than the second value (M2), and the second value is greater than M1.

If, at step 460, the calculated Offset is not greater than a second offset value X dB and not greater than the first offset value Y dB, the UE's RRM measurement cycle period may be maintained at the default value M1, or set to the default value M1 at step 480. Thus, if the Offset calculated in a next RRM measurement cycle drops from above Y dB to below X dB, then the RRM measurement cycle period is reset from M4 to its default value M1. The steps 410-480 repeat in each subsequent RRM measurement cycle.

In another embodiment, the UE may lengthen the DRX cycle period only after the received signal quality is consistent over N consecutive measurements of the PCell. The received signal quality is consistent when the variation of the measurements is less than K dB (e.g., K=0.3 or another value). The UE may calculate the difference among N-consecutively measured signal quality of the PCell to determine whether the received signal quality is consistent over the measurements. For example, if N=2, the UE may calculate the difference between two-consecutively measured signal quality of the PCell. Thus, according to one example of this embodiment, an RSRP variation threshold (e.g., K dB) can be used on top of the threshold(s) (e.g., the aforementioned X and Y dB) between the PCell and the BCell to guarantee that the UE does not extend its RRM measurement cycle when the PCell's RSRP variation is large (e.g., greater than K dB).

Figure 5:
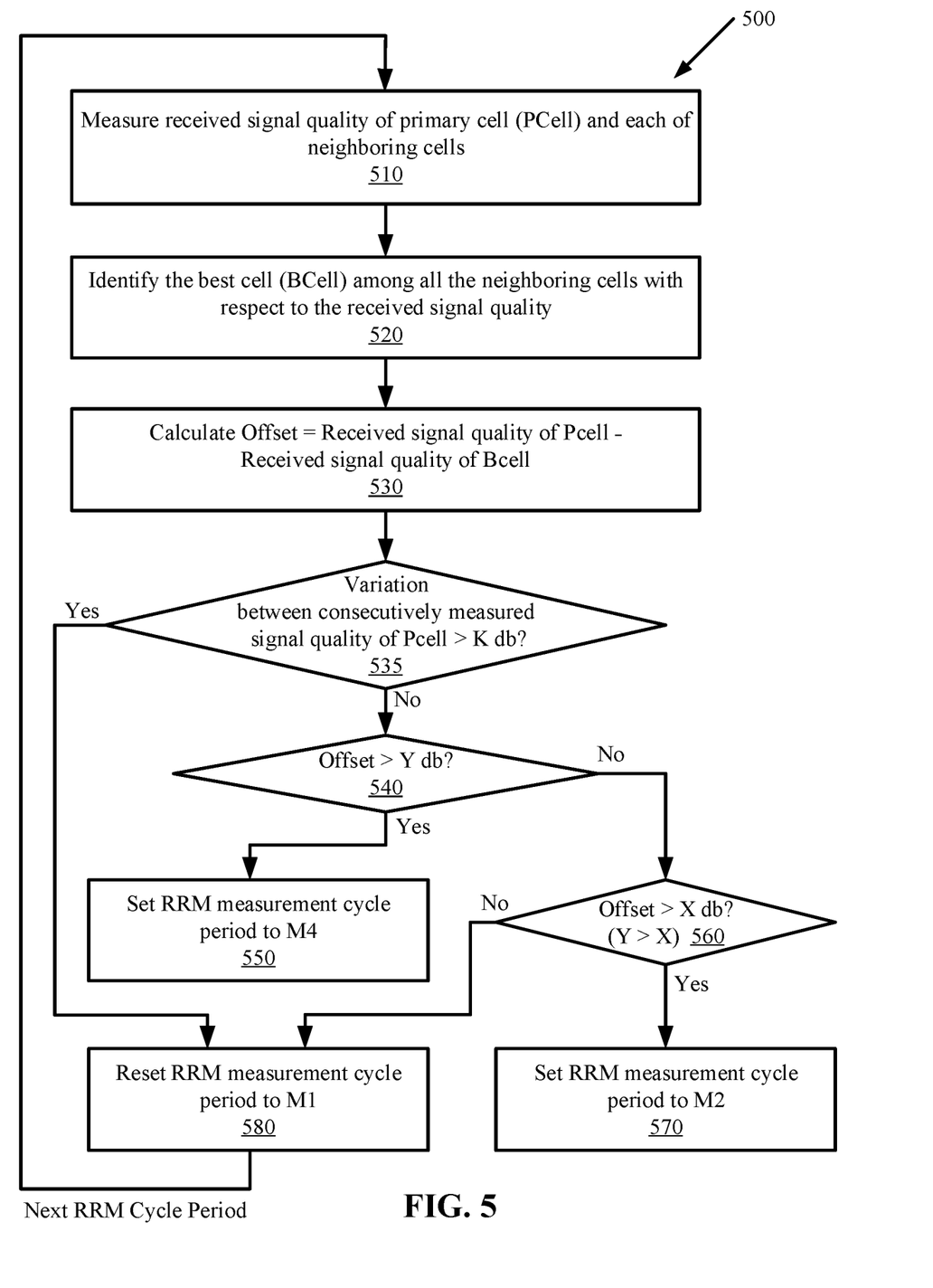
FIG. 5 is a flow diagram illustrating a method for determining an RRM measurement cycle period according to another embodiment.

FIG. 5 is a flow diagram illustrating a method 500 for determining an RRM measurement cycle period according to another embodiment. Method 500 has the same steps as method 400 and an addition step 535. The description of the same steps as those in method 400 is not repeated herein. After the UE at step 530 calculates Offset, which is equal to the received signal quality of PCell minus the received signal quality of BCell, the UE at step 535 determines whether the variation (i.e., the absolute value of the difference) between consecutive measured signal quality of PCell is greater than pre-determined K dB. For example, the UE may compare the measured signal quality of PCell in the current cycle with the measured signal quality of PCell in the immediately-preceding cycle. If the variation is greater than K dB, then the UE resets the RRM measurement cycle period to the default value M1, or maintains the M1 value if the current RRM measurement cycle period is M1.

Figure 6:
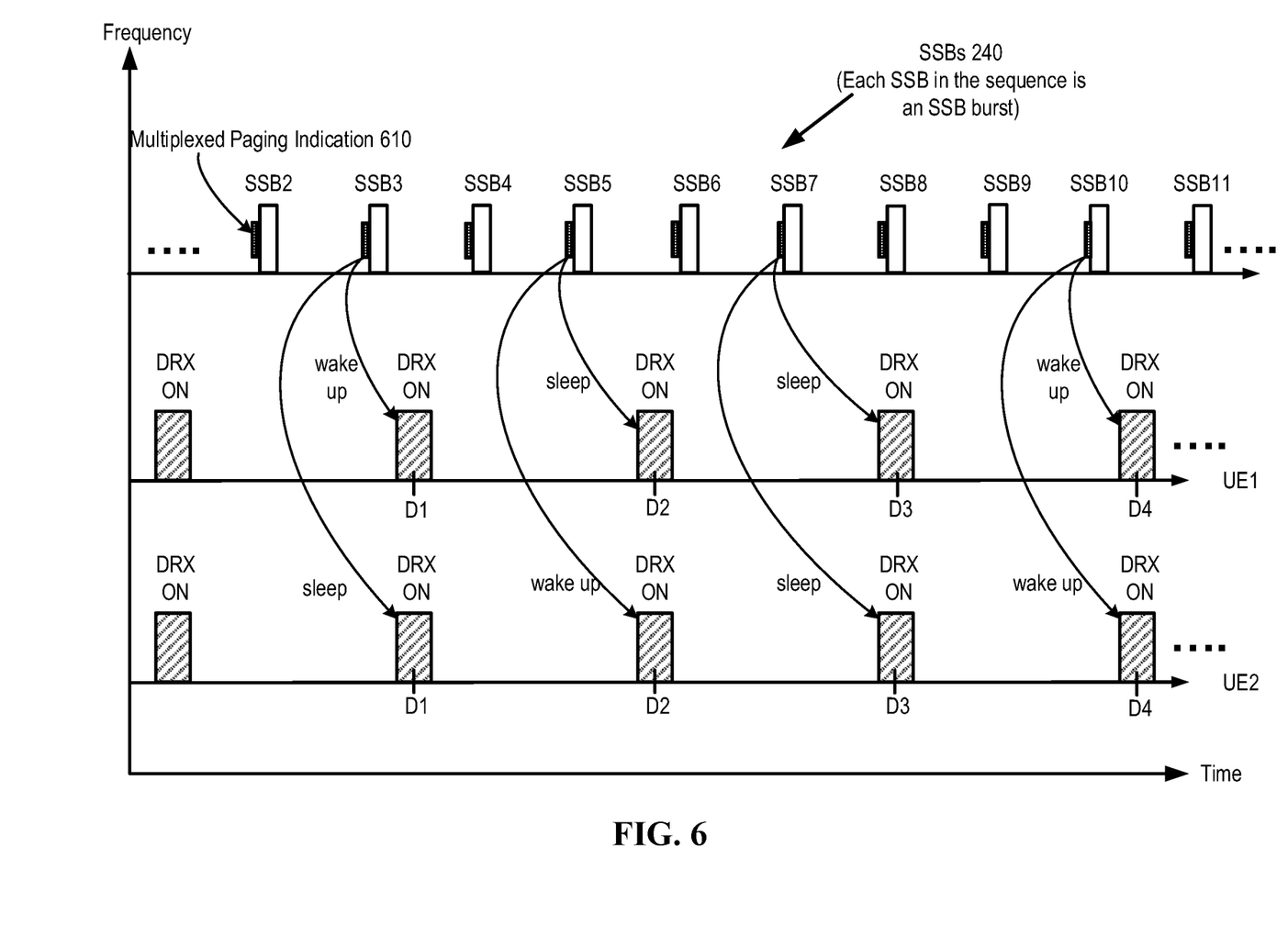
FIG. 6 is a diagram illustrating a paging indication according to one embodiment.

Another approach to UE power saving is to keep a UE in the sleep state in a DRX ON duration when there is no message pending for the UE at the network. FIG. 6 is a diagram illustrating a paging indication according to one embodiment. The paging indication is used to wake up a UE for receiving a message in the next DRX ON duration. In this example, the paging indication is a multiplexed paging indication 610 immediately preceding (in time) an SSB in the sequence of SSBs 240. A BS may use the multiplexed paging indication 610 to simultaneously page multiple UEs in the same cell.

In one embodiment, a BS may send each multiplexed paging indication 610 immediately before each SSB in the sequence of SSBs 240. That is, the paging indication 610 may be broadcast by a BS at a fixed time interval equal to a time interval for SSB burst transmission. In an alternative embodiment, a BS may broadcast the paging indication at a fixed time interval larger than the time interval for SSB burst transmission. For example, a BS may send each multiplexed paging indication 610 immediately before each SSB in a subset of the SSBs 240; e.g., one SSB in every DRX cycle period (where DRX cycle period is greater than SSB cycle period).

In one embodiment, multiple UEs may be paged by the multiplexed paging indication 610 simultaneously by code-division multiplexing (CDM). For example, the multiplexed paging indication 610 may be generated by multiplying an SSS block with an identifier; e.g., a code or spreading code that uniquely identifies a paging group including the UE being paged. The result of the multiplication is a coded SSS block that can be used to identify a paging group. A paging group may include one or more UEs. Codes that identify different paging groups are orthogonal to each other. Thus, a UE can multiply its unique code with a received multiplexed paging indication 610 to determine whether it is paged. If the UE is paged, the multiplication result contains the SSS block. If the UE is not paged, the multiplication result is a noise-like signal and cannot be decoded by the UE.

FIG. 6 shows a sequence of the multiplexed paging indications 610, each represented by a shaded block preceding a corresponding SSB 240. The paging indications 610 and the SSBs 240 may not be drawn to scale with respect to the time lengths and frequency ranges. In an embodiment where CDM is used, the multiplexed paging indication 610 is generated from multiplexing multiple SSS blocks coded with respective paging group identifiers. An SSS block, as used herein, is a "standalone" SSS located outside of the frequency-and-time resources scheduled for the SSBs. That is, an SSS block does not occupy the same frequency-and-time resources scheduled for the SSBs. An SSS block is generated using the same sequence generation formula as that for generating the SSS 260 (FIG. 2) inside an SSB. The sequence generation formula for generating a 127-value SSS sequence (where each value is 1 or −1) is known in the art. The sequence generation formula uses cell ID as an input variable to generate different combinations of 1 and −1 in an SSS sequences. The cell ID of an SSS block and the SSS 260 inside an SSB may or may not be the same. In one embodiment, each SSS block corresponds to one OFDM symbol in the time domain and 127 subcarriers in the frequency domain. Each subcarrier may carry a value of 1 or −1. With the CDM, different paging groups are differentiated by different spreading codes. Each spreading code may include one combination of 127 values of 1 or −1. By dispreading a received paging indication (i.e., multiplying the received paging indication with a spreading code), a UE can obtain another sequence of 127 values, from which the UE can determine whether its paging group is paged.

Although FIG. 6 shows that the multiplexed paging indication 610 lies in the same frequency as the SSBs 240, in some embodiments the multiplexed paging indication 610 may be located outside the frequency range of the SSBs 240. Furthermore, although FIG. 6 shows that each multiplexed paging indication 610 occupies a symbol time immediately preceding a corresponding SSB, in some embodiments each multiplexed paging indication 610 may occupy a symbol time that precedes but not immediately precedes a corresponding SSB 240.

In an alternative embodiment, a paging indication may be multiplexed by frequency-division multiplexing (FDM). Thus, a BS may send multiple SSS blocks in multiple different frequency locations to page multiple paging groups of UEs, with each frequency location corresponds to one paging group. In yet another alternative embodiment, a paging indication may be multiplexed by time-division multiplexing (TDM). Thus, a BS may send multiple SSS blocks in multiple different time locations to page multiple paging groups of UEs, with each time location corresponds to one paging group.

In the embodiment of FIG. 6, a BS sends a sequence of the multiplexed paging indications 610 to UEs in its cell to notify one or more of the UEs that they have messages pending at the network. The multiplexed paging indications 610 may be transmitted to the UEs periodically; e.g., once every SSB cycle, or once every idle mode UE DRX cycle. In one embodiment, the multiplexed paging indications 610 may be transmitted less frequently than SSBs 240 to minimize resource overhead.

When a UE is paged to receive a pending message, the UE wakes up in the next DRX ON duration to receive the message. If a UE is not paged, the UE may stay in the sleep state throughout the next DRX ON duration. The UE (that is not paged) may use the multiplexed paging indication 610 for AGC tuning and the SSB 240 immediately following that the multiplexed paging indication 610 for the RRM measurement. The UEs may monitor the paging channel at pre-configured time instants.

The example of FIG. 6 shows the paging indications 610 multiplexed by CDM. Both UE1 and UE2 monitor the frequency location where the paging indications 610 and the SSBs 240 are transmitted at pre-determined time instants. Each UE may enter a sleep state when it is not receiving or transmitting signals. Both UE1 and UE2 multiply the paging indications 610 with their respective code to determine whether it is paged. For example, the paging indication 610 immediately preceding SSB3 may indicate that UE1 is paged and UE2 is not. Thus, at the next DRX ON duration (centered at time D1), UE1 wakes up to receive a message and UE2 may stay in the sleep state. The paging indication 610 immediately preceding SSB10 may indicate that both UE1 and UE2 are paged. Thus, at the next DRX ON duration (centered at time D4), both UE1 and UE2 wake up to receive their respective messages.

The multiplexed paging indications 610 may apply to UEs having DRX ON durations not aligned in time. The multiplexed paging indications 610 may apply to UEs that are scheduled to share the same frequency resource for signal transmission and/or reception.

Figure 7:
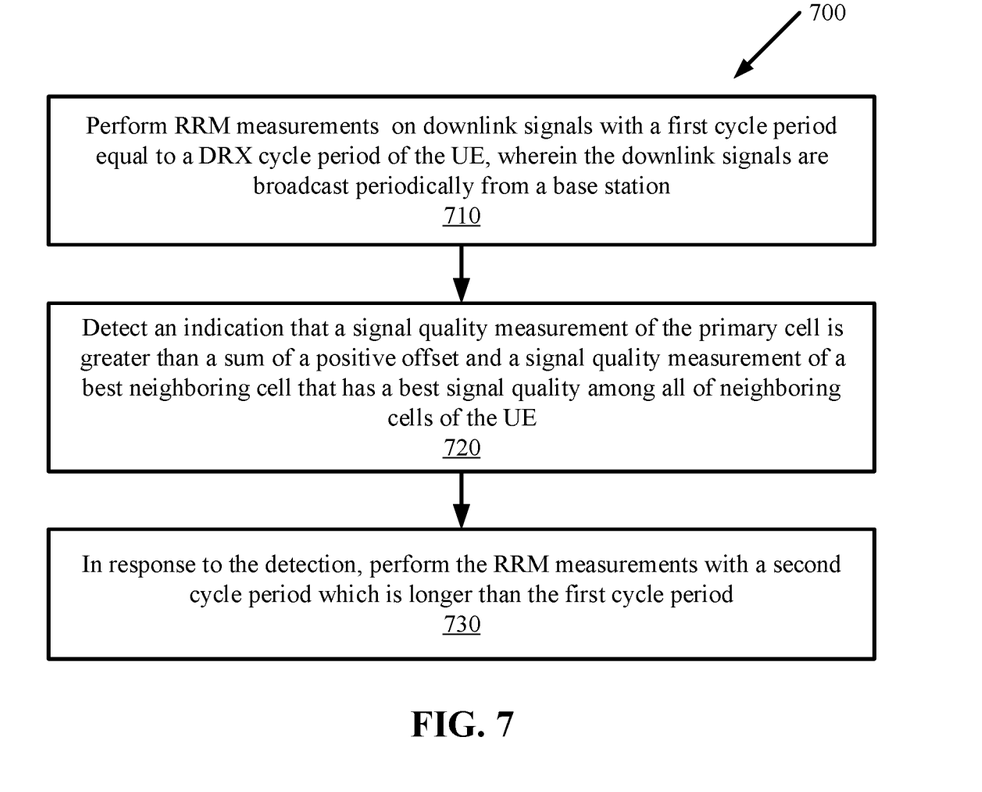
FIG. 7 illustrates a method performed by a UE in a wireless network for RRM measurements according to one embodiment.

FIG. 7 illustrates a method 700 performed by a UE in a wireless network for RRM measurements according to one embodiment. In one embodiment, the wireless network is a 5G NR network. In one embodiment, an example of the wireless network may be the network 100 of FIG. 1.

The method 700 starts at step 710 when a UE performs RRM measurements on downlink signals with a first cycle period equal to a DRX cycle period of the UE. The downlink signals are broadcast periodically from a base station. The UE at step 720 detects an indication that a signal quality measurement of the primary cell (PCell) is greater than a sum of a positive offset and a signal quality measurement of a best neighboring cell (BCell) that has the best signal quality among all of neighboring cells of the UE. In response to the indication, the UE at step 730 performs the RRM measurements with a second cycle period which is longer than the first cycle period.

Figure 8:
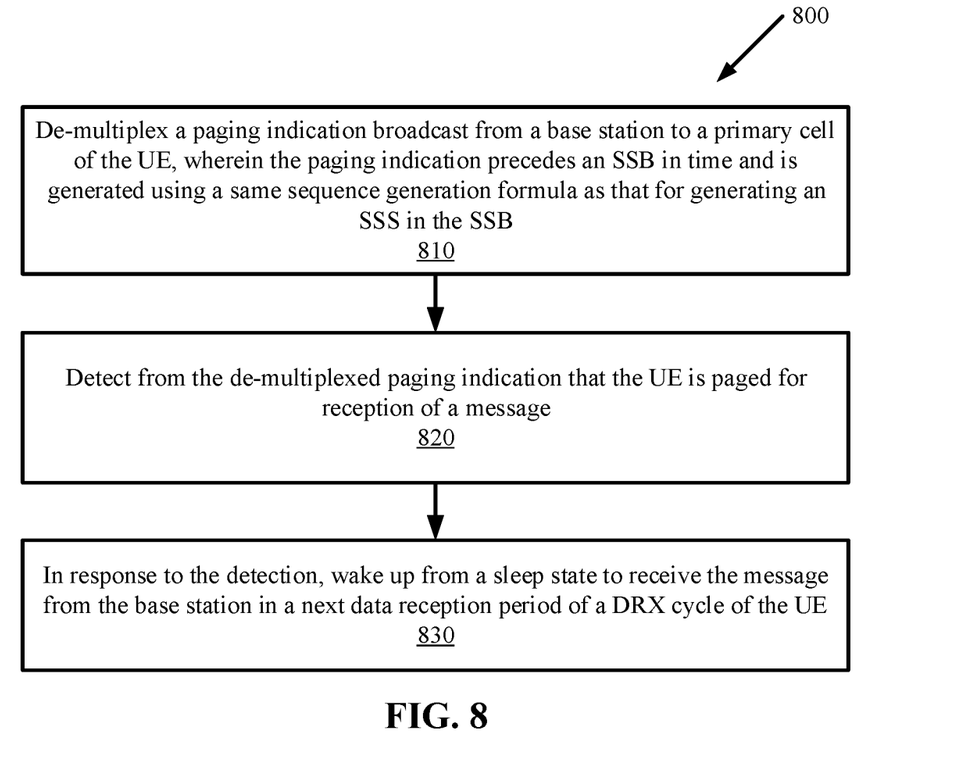
FIG. 8 illustrates a method performed by a UE in a wireless network for receiving a paging indication according to one embodiment.

FIG. 8 illustrates a method 800 performed by a UE in a wireless network for receiving a paging indication according to one embodiment. In one embodiment, the wireless network is a 5G NR network. In one embodiment, an example of the wireless network may be the network 100 of FIG. 1.

The method 800 starts at step 810 when a UE de-multiplexes the paging indication broadcast from a base station to a primary cell of the UE. The paging indication precedes an SSB in time. The same sequence generation formula may be used to generate the paging indication and the SSS in the SSB. The UE at step 820 detects from the de-multiplexed paging indication that the UE is paged for the reception of a message. In response to the detection, the UE at step 830 wakes up from a sleep state to receive the message from the base station in a next data reception period of a DRX cycle of the UE.

Figure 9:
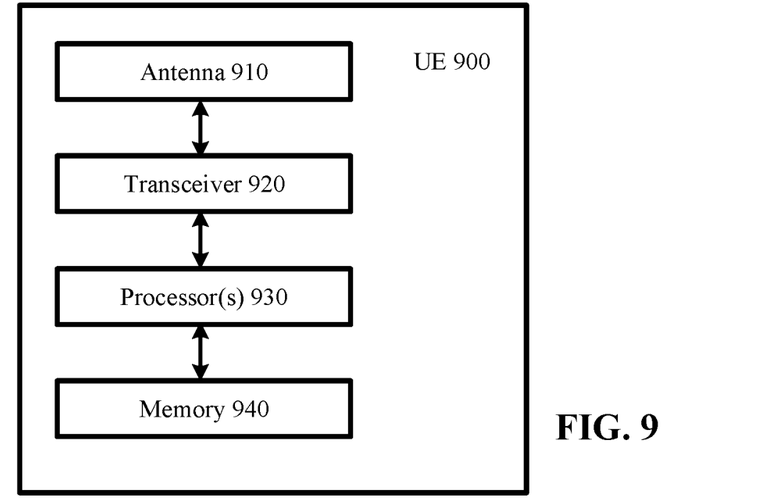
FIG. 9 is a block diagram illustrating elements of a UE according to one embodiment.

FIG. 9 is a block diagram illustrating elements of a UE 900 (also referred to as a wireless device, a wireless communication device, a wireless terminal, etc.) configured to provide uplink transmission according to one embodiment. As shown, the UE 900 may include an antenna 910, and a transceiver circuit (also referred to as a transceiver 920) including a transmitter and a receiver configured to provide at least uplink and downlink radio communications with a base station of a radio access network. The UE 900 may also include a processor circuit (which is shown as a processor 930 and which may include one or more processors) coupled to the transceiver 920. The processor(s) 930 may include one or more processor cores. The UE 900 may also include a memory circuit (also referred to as memory 940) coupled to the processor 930. The memory 940 may include computer-readable program code that when executed by the processor 930 causes the processor 930 to perform operations according to embodiments disclosed herein, such as method 700 in FIG. 7 and method 800 in FIG. 8. The UE 900 may also include an interface (such as a user interface). It is understood the embodiment of FIG. 9 is simplified for illustration purposes. Additional hardware components may be included.

Although the UE 900 is used in this disclosure as an example, it is understood that the methodology described herein is applicable to any computing and/or communication device capable of transmitting uplink signals to a base station.

The operations of the flow diagrams of FIGS. 7 and 8 have been described with reference to the exemplary embodiments of FIGS. 1 and 9. However, it should be understood that the operations of the flow diagrams of FIGS. 7 and 8 can be performed by embodiments of the invention other than the embodiments of FIGS. 1 and 9, and the embodiments of FIGS. 1 and 9 can perform operations different than those discussed with reference to the flow diagrams. While the flow diagrams of FIGS. 7 and 8 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a user equipment (UE) in a wireless network for Radio Resource Management (RRM) measurements, comprising:
   performing RRM measurements on downlink signals with a first cycle period equal to a Discontinuous Reception (DRX) cycle period of the UE, wherein the downlink signals are broadcast periodically from a base station;
   detecting an indication that a signal quality measurement of the primary cell is greater than a sum of a positive offset and a signal quality measurement of a best neighboring cell that has a best signal quality among all of neighboring cells of the UE; and
   in response to the indication, performing the RRM measurements with a second cycle period which is longer than the first cycle period.

2. The method of claim 1, further comprising:
   in response to another indication that the signal quality of the primary cell drops below the sum, performing the RRM measurements with the first cycle period.

3. The method of claim 1, wherein when the positive offset of Y value corresponds to a longer second cycle period, and the positive offset of X value corresponds to a shorter second cycle period, and wherein Y>X.

4. The method of claim 3, wherein the longer second cycle period is four times the DRX cycle period.

5. The method of claim 3, wherein the longer second cycle period is two times the DRX cycle period.

6. The method of claim 1, further comprising:
   calculating a difference between two consecutive signal quality measurements of the primary cell; and
   performing the RRM measurements in response to the detection when the difference is below a predetermined threshold.

7. The method of claim 1, wherein the downlink signals are Synchronization Signal Blocks (SSBs).

8. The method of claim 1, wherein the RRM measurements may include measurements of one or more of: Reference Signal Received Power (RSRP), Reference Signal Received Quality (RSRQ), and Signal to interference and noise ratio (SINR).

9. The method of claim 1, wherein the wireless network is a Fifth Generation New Radio (5G NR) network.

* * * * *